United States Patent
Ramaswamy et al.

(10) Patent No.: US 8,789,205 B2
(45) Date of Patent: Jul. 22, 2014

(54) ROLE-BASED GRAPHICAL USER INTERFACES

(75) Inventors: Sanjay H. Ramaswamy, Redmond, WA (US); Yun-Rui SiMa, Beijing (CN); Yingtao Dong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 12/764,135

(22) Filed: Apr. 21, 2010

(65) Prior Publication Data
US 2011/0265188 A1    Oct. 27, 2011

(51) Int. Cl.
| G06F 17/30 | (2006.01) |
| G06F 7/04 | (2006.01) |
| H04N 7/16 | (2011.01) |
| G06F 3/048 | (2013.01) |
| G06F 21/31 | (2013.01) |
| G06F 21/62 | (2013.01) |
| G06F 21/00 | (2013.01) |
| G06F 3/0481 | (2013.01) |

(52) U.S. Cl.
CPC ............... *G06F 3/048* (2013.01); *G06F 21/31* (2013.01); *G06F 21/6218* (2013.01); *G06F 21/00* (2013.01); *G06F 3/0481* (2013.01)
USPC ............. 726/28; 715/764; 715/741; 707/783; 726/2

(58) Field of Classification Search
CPC ..... G06F 3/048; G06F 21/31; G06F 21/6218; G06F 21/00; G06F 3/0481
USPC ........................................... 726/28; 715/764
See application file for complete search history.

(56) References Cited

U.S. PATENT DOCUMENTS

| 5,748,890 | A | * | 5/1998 | Goldberg et al. ............... 726/2 |
| 5,754,306 | A | * | 5/1998 | Taylor et al. ................. 358/400 |
| 5,796,967 | A | * | 8/1998 | Filepp et al. .................. 715/764 |
| 5,821,933 | A | * | 10/1998 | Keller et al. .................. 715/741 |
| 5,911,143 | A | * | 6/1999 | Deinhart et al. ..................... 1/1 |
| 6,014,666 | A | * | 1/2000 | Helland et al. ..................... 1/1 |
| 6,122,664 | A | * | 9/2000 | Boukobza et al. ............ 709/224 |
| 6,201,539 | B1 | * | 3/2001 | Miller et al. .................. 715/866 |
| 6,519,647 | B1 | * | 2/2003 | Howard et al. ............... 709/229 |
| 6,574,736 | B1 | * | 6/2003 | Andrews ......................... 726/21 |
| 6,857,017 | B1 | * | 2/2005 | Faour et al. ................... 709/224 |
| 6,886,100 | B2 | * | 4/2005 | Harrah et al. ...................... 726/3 |
| 7,007,026 | B2 | * | 2/2006 | Wilkinson et al. ................... 1/1 |

(Continued)

OTHER PUBLICATIONS

Windows Authorization Manager—Published Date: May 12, 2008, 7 pgs., http://msdn.microsoft.com/en-us.library/bb897401.aspx.

(Continued)

*Primary Examiner* — Carolyn B Kosowski
(74) *Attorney, Agent, or Firm* — Louise Bowman; Jim Ross; Micky Minhas

(57) ABSTRACT

A role-based Graphical User Interface (GUI) may be provided. First, information associated with an application user may be received. A role associated the application user may be then determined. The role may then be analyzed to determine which application elements are permitted to the user and which application elements are restricted from the application user. Next, the permitted application elements may be loaded with permissible GUI elements visible and restricted GUI elements hidden. The permissible GUI elements may be associated with the application elements permitted to the application user, while the restricted GUI elements may be associated with the application elements restricted from the user.

20 Claims, 8 Drawing Sheets

(56) References Cited

U.S. PATENT DOCUMENTS

| | | | |
|---|---|---|---|
| 7,107,610 B2* | 9/2006 | Lortz | 726/4 |
| 7,305,392 B1* | 12/2007 | Abrams et al. | 707/770 |
| 7,359,908 B2* | 4/2008 | Brodhun et al. | 707/760 |
| 7,409,710 B1* | 8/2008 | Uchil et al. | 726/19 |
| 7,526,495 B2* | 4/2009 | Chai | 1/1 |
| 7,546,633 B2* | 6/2009 | Garg et al. | 726/4 |
| 7,552,420 B1* | 6/2009 | Smith et al. | 717/121 |
| 7,574,445 B2* | 8/2009 | Chai | 1/1 |
| 7,657,870 B2* | 2/2010 | Berg et al. | 717/120 |
| 7,676,767 B2* | 3/2010 | Hofmeister et al. | 715/863 |
| 7,840,907 B2* | 11/2010 | Kikuchi et al. | 715/790 |
| 7,882,250 B2* | 2/2011 | Bieber | 709/229 |
| 8,171,415 B2* | 5/2012 | Appleyard et al. | 715/747 |
| 8,490,053 B2* | 7/2013 | Olson et al. | 717/120 |
| 2004/0015822 A1* | 1/2004 | Linton et al. | 717/104 |
| 2004/0083367 A1* | 4/2004 | Garg et al. | 713/170 |
| 2004/0139092 A1* | 7/2004 | Jones et al. | 707/100 |
| 2005/0262549 A1* | 11/2005 | Ritt et al. | 726/1 |
| 2006/0195818 A1* | 8/2006 | Berg et al. | 717/116 |
| 2006/0284852 A1* | 12/2006 | Hofmeister et al. | 345/173 |
| 2007/0101293 A1* | 5/2007 | Cherry et al. | 715/823 |
| 2007/0234218 A1 | 10/2007 | Baschy | 715/741 |
| 2007/0240062 A1* | 10/2007 | Christena et al. | 715/741 |
| 2007/0240231 A1 | 10/2007 | Haswarey et al. | 726/28 |
| 2007/0260737 A1 | 11/2007 | Gomes et al. | 709/229 |
| 2007/0266330 A1* | 11/2007 | Friedland et al. | 715/764 |
| 2008/0235580 A1* | 9/2008 | Gonze et al. | 715/700 |
| 2008/0301803 A1 | 12/2008 | Ontaneda et al. | 726/17 |
| 2009/0007223 A1* | 1/2009 | Centonze et al. | 726/1 |
| 2009/0259588 A1* | 10/2009 | Lindsay | 705/40 |
| 2009/0260056 A1 | 10/2009 | Garg et al. | 726/1 |
| 2011/0277017 A1* | 11/2011 | Ivanov et al. | 726/4 |

OTHER PUBLICATIONS

Bindiganavale et al., "Role Based Access Control in Enterprise Application—Security Administration and User Management,"—Published: 2006, pp. 111-116, http://ieeexplore.ieee.org//stamp/stamp.jsp?tp=&arnumber=04018474.

What's in CMDB Solution 7.0—Published, Date: Sep. 17, 2009, 5 pgs., http://www.symantec.com/connect/articles/whats-cmdb-solution-70.

SAS 9.2 Management Console—Retrieved Date: Jan. 29, 2010, 58 pgs., http://support.sas.com/documentation/edl/en/mesecug/61708/PDF/default/mesecug.pdf.

Security Management Portal (SMP)—Retrieved Date: Jan. 29, 2010, 5 pgs., http://www.checkpoint.com/products/smp/index.html.

* cited by examiner

_330_

335

```
Pages Declaration

<Page Name="GeneralPropertyControl">Mailbox,MailboxStatistics</Page>
<Page Name="InformationPropertyControl">Mailbox,User</Page>
<Page Name="AddressAndPhonePropertyControl">User</Page>
<Page Name="OrganizationPropertyControl">User</Page>
<Page Name="MailboxAccountPropertyControl">User</Page>
<Page Name="MemberOfPropertyControl">Mailbox</Page>
<Page Name="RecipientsProxyAddressPropertyControl">Mailbox</Page>
<Page Name="MailboxSettingsPropertyControl">Mailbox</Page>
<Page Name="MailFlowPropertyControl">Mailbox</Page>
```

340

```
Data Objects Declaration

<DataObjectProfile Name="Mailbox" Type="meddm:Mailbox" />
<DataObjectProfile Name="MailboxStatistics" Type="medm:MailboxStatistics"/>
<DataObjectProfile Name="User" Type="meddm:User" />
<DataObjectProfile Name="CalendarConfiguration"
Type="meds.CalendarConfiguration" />
<DataObjectProfile Name="CASMailbox" Type="meddm:CASMailbox" />
<DataObjectProfile Name="UMMailbox" Type="meddm:UMMailbox" />
<DataObjectProfile Name="UMMailboxPin" Type="memtum:UMMailboxPin" />
```

345

```
Read Tasks Declaration

<ReaderTaskProfile DataObjectName="Mailbox" Name="GetMailbox" >
  <ReaderTaskProfile.ParameterProfileList>
    <ParameterProfileList Capacity="4">
      <ParameterProfileName="Identity" ParameterType="Column" />
    <ParameterProfileList>
  <ReaderTaskProfile.ParameterProfileList>
  <ReaderTaskProfile.Runner>
    <MonadReadTask CommandText="Get-Mailbox" />
  <ReaderTaskProfile.Runner>
<ReaderTaskProfile>
```

*FIG. 3B*

ROLE-BASED GRAPHICAL USER INTERFACES

BACKGROUND

A challenging problem in managing large networks may be the complexity of security administration. Within an organization, roles may be created for various job functions. Members of staff (or other system users) may be assigned particular roles, and may perform particular system functions associated with those roles. The permissions to perform the particular system functions may typically be encoded within access control lists (ACLs) associated with management applications. In order to update role permissions or restrictions, ACL modification may be necessary. However, several challenges may be presented with ACL modification, such as unintended consequences with ACLs modification and ACLs maintenance through application upgrades.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A role-based Graphical User Interface (GUI) may be provided. First, information associated with an application user may be received. A role associated the application user may be then determined. The role may then be analyzed to determine which application elements are permitted to the user and which application elements are restricted from the application user. Next, the permitted application elements may be loaded with permissible GUI elements visible and restricted GUI elements hidden. The permissible GUI elements may be associated with the application elements permitted to the application user, while the restricted GUI elements may be associated with the application elements restricted from the user.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 3B shows an example of an XML driven framework for implementing RBAC-aware application components to provide a role-based GUI;

DETAILED DESCRIPTION

Figure 1:
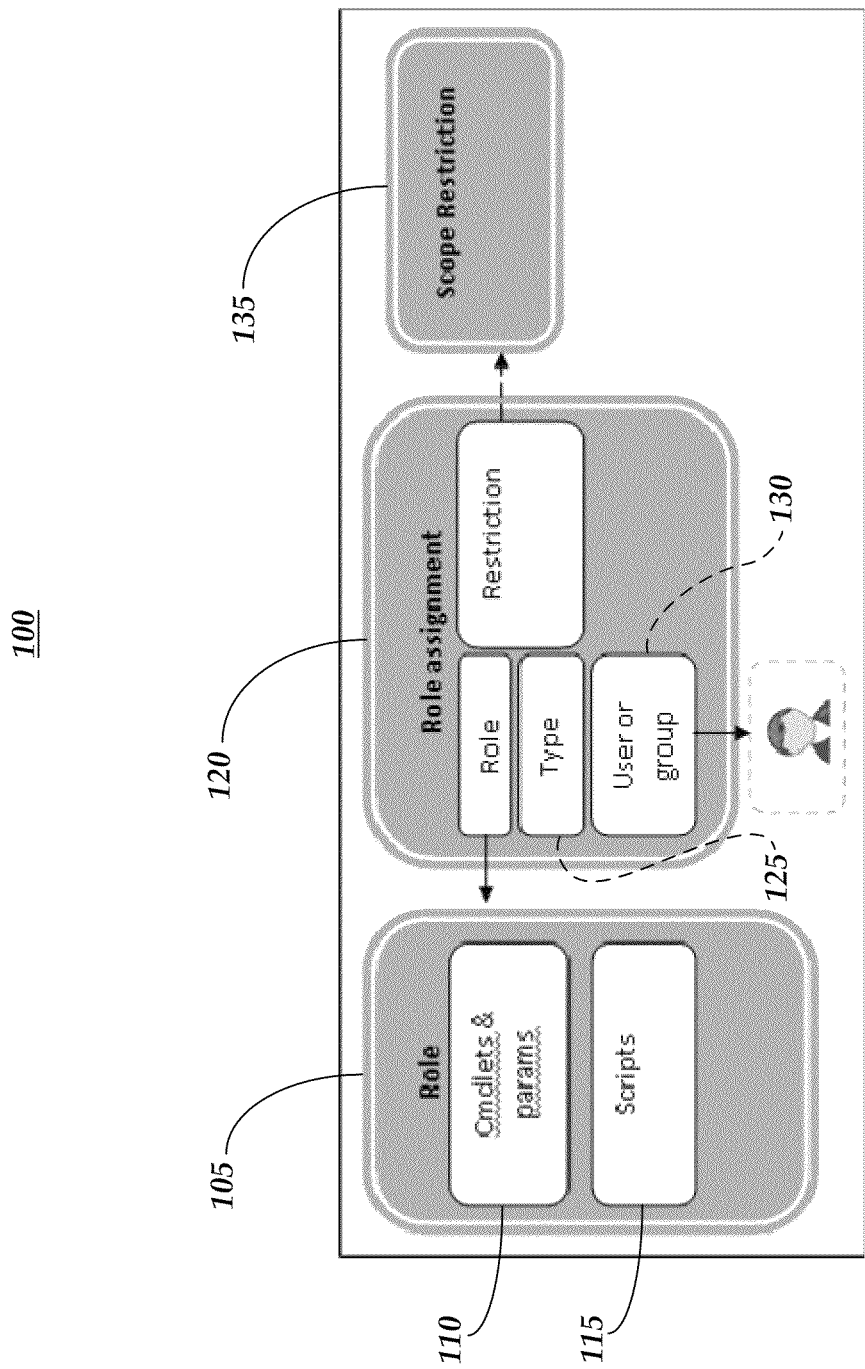
FIG. 1 is a block diagram showing a Role-Based Access Control (RBAC) operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A role-based Graphical User Interface (GUI) may be provided. Consistent with embodiments of the invention, Role-Based Access Control (RBAC) is a permissions model that may be integrated into a Graphical User Interface (GUI) associated with, for example, a server management application. In an RBAC permissions model, security control may be provided at both broad and granular levels, establishing roles of administrators as well as end-users. The RBAC permissions model may be integrated into management applications to enable a control of both administrative tasks and an extent to which users may administer, for example, their own mailbox and distribution groups. In this way, RBAC may allow administrators to closely align roles assigned to application users to the actual roles the users hold within an organization.

Embodiments of the invention may comprise RBAC-aware server management application components. For example, access to 'Cmdlets', or functions, Cmdlet parameters, scripts, GUI elements, 'Remote PowerShell', and other underlying application components, may all be integrated to become aware of RBAC settings. In this way, the server management application may display, hide, enable, disable, or otherwise provide or restrict functionality based on a user's access to these RBAC-aware components and their corresponding RBAC settings.

Consistent with embodiments of the invention, RBAC may comprise pre-set and customizable roles within a server management application. These roles may be pre-defined with various access levels to functions provided by the server management application. Roles not having access to certain application functions may be restricted from operating application functionality associated with those functions.

Furthermore, embodiments of the invention may integrate RBAC settings with GUI elements of the server management application to depict application user interfaces for each role. Consistent with embodiments of the invention, an RBAC permissions model may be used to allow or restrict certain GUI elements from being displayed based on a user's assigned role. For example, a first user who is assigned a role that does not have access to database administration functionality may not be provided GUI elements associated with any database administration functions. Similarly, a second user who is assigned a role that does not have access to mailbox administration may not be provided with GUI elements associated with mailbox administration functions. In this way, function access restriction may ensure that low-level administrative roles are not exposed to the same administrative information and functionality accessible to high-level administrative roles.

In various embodiments, GUI element restriction may be depicted to the user, for example, as a lock icon displayed in association with the corresponding GUI element. In various other embodiments, however, restricted GUI elements may not be displayed at all. A similar principle may be applied for displaying, rather than restricting, GUI elements.

Without the RBAC-aware application components and corresponding GUI integration, a user may appear to have complete access to all application components, and may only realize that he does not have such access when inaccessible functions associated with the application components are called for execution. This may be especially true in, for example, multi-step application wizards requiring the user to enter several parameters, but not providing an 'Access Error' message until the user complete the wizards. To overcome this problem, embodiments of the invention may integrate server management application components and corresponding GUI elements to become RBAC-aware.

FIG. 1 is a block diagram showing an RBAC operating environment 100. Consistent with embodiments of the invention, RBAC may define a role 105 in terms of its permissible and restricted operations within a server management application. As set forth above, these permissible operations may be associated with RBAC-aware application components. In turn, these RBAC-aware components may be employed in, for example, either restricting or permitting access to certain application functionalities and GUI elements corresponding thereto.

For example, a plurality of Cmdlets and parameters 110 and scripts 115 may be grouped together to define role 105. Role 105 may comprise, but is not limited to, pre-set roles, such as a database administrator, a mailbox administer, a group administrator, and a tasks administrator role. Each administrative role may comprise pre-defined Cmdlets and parameters 110 for the role. Consistent with embodiments of the invention, role assignment 120 may assign role 105 to a user or group of users 130. In this way, an administrative role, for example, may be assigned to a database administrator within a company. A type 125 may further align role 105 to better fit an actual role user 130 may hold within the company. For example, type 125 may further define the administrative role to be a 'database' administrative role for the database administrator. In various embodiments, role assignment 120 may allow for role 105 to be delegated from one user (e.g., a high-level administrator) to another user (e.g., a low-level administrator).

Embodiments of the invention may allow for a customization of the pre-set roles, or a creation of new roles. Role customization may comprise setting a restriction 135 on various aspects of role 105. For example, a pre-set database administrator role may comprises a 'new' database Cmdlet, a 'delete' database Cmdlet, and an 'edit' database Cmdlet. Restriction 135 may limit the scope of the operations and functions permitted to the database administrator role by restricting, for instance, the 'delete' database Cmdlet.

As a result, the customized database administrator role may have its scope restricted, no longer granting user access to application functionality associated with the 'delete' database Cmdlet. As will be detailed below, embodiments of the invention may further restrict GUI elements associated with the 'delete' database Cmdlet. In this way, customized role 105 may be denied access to applications components and GUI elements associated with the restricted application components. Embodiments of the invention may further allow for role creation by grouping permissible Cmdlets and parameters 110 to form role 105.

Figure 2A:
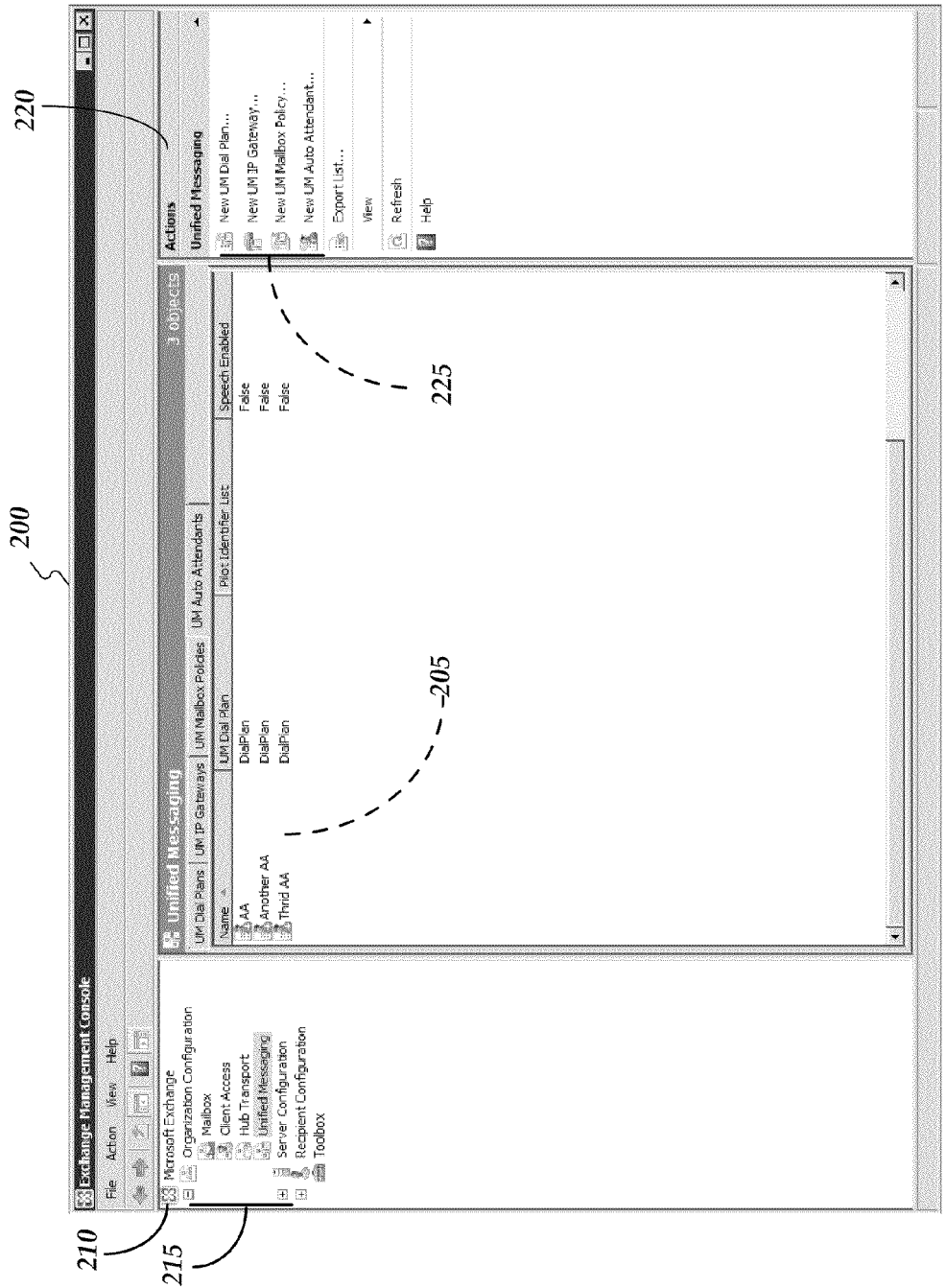
FIG. 2A shows a GUI of an RBAC-aware infrastructure management application.

FIG. 2A shows an RBAC-aware infrastructure management application consistent with embodiments of the invention. RBAC-aware infrastructure management application 200 may be an Exchange Management Console or any other server management application. Management application 200 may be used to create new application objects or edit existing objects 205. Each object may be associated with a network domain 210 and corresponding network tools, configurations, and functions (or 'network elements') 215. Moreover, objects may be created and managed via an actions pane 220 comprising actions 225 that may be performed in management application 200.

Embodiments of the invention may integrate objects 205, network elements 215, and actions 225 to be RBAC-aware components. In this way, based on a role 105 associated with an application user 130, certain application objects, network elements, and actions may be provided or restricted from use, with their corresponding GUI elements locked or hidden from display. Role 105 of the application user 130 may be derived from, for example, identity information associated with user 130's role assignment 120, his association with network domain 210, or any application or system login information provided by him.

Figure 2B:
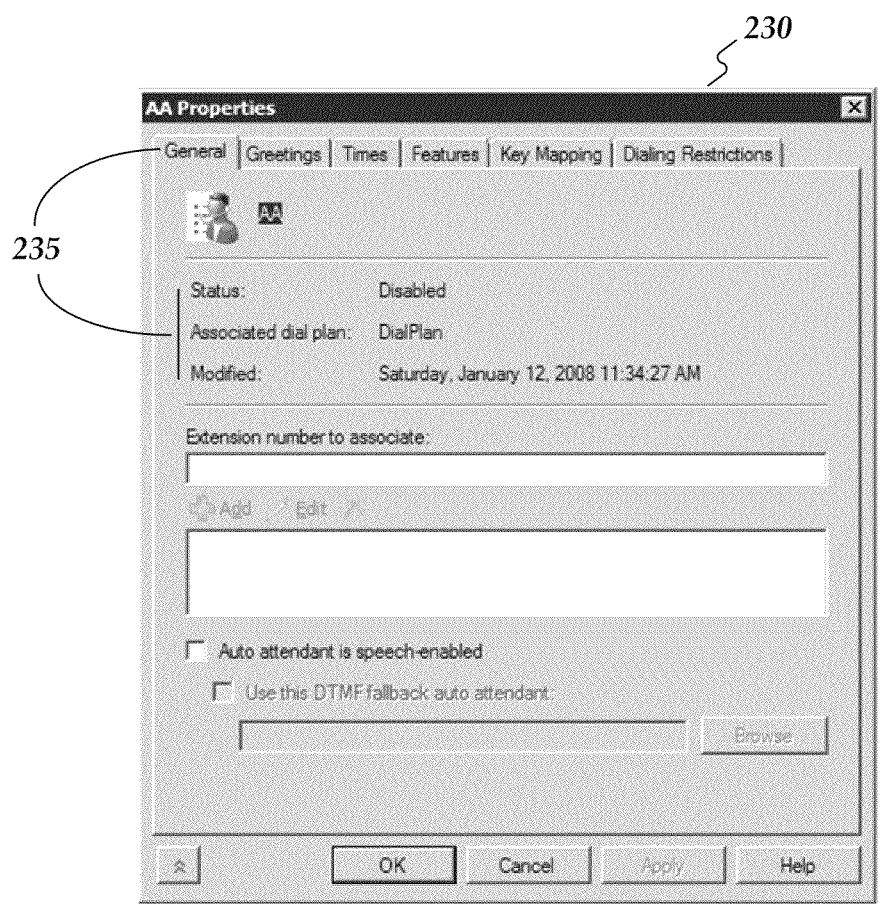
FIG. 2B shows another GUI of RBAC-aware infrastructure management application.

FIG. 2B shows a GUI of management application 200. Each of the objects 205 may be associated a plurality of editable properties 235. Properties 235 may be displayed in properties GUI 230. Furthermore, properties 235 may be RBAC-aware components of management application 200. As such, certain properties and their corresponding GUI elements may be locked or hidden from display based on the permissions of role 105 assigned to application user 130.

Consistent with embodiments of the invention, objects 205 and properties 235 may be used to assign a user or group of users 130 a role 105 and corresponding scope restrictions 135 through management application 200 and properties GUI 230. Such role assignment within management application 200 may be granted to high-level administrative users of the management application 200. In other embodiments of the invention, objects 205 may be used for mailbox management, with corresponding mailbox management properties and settings established within properties GUI 230. These mailbox management objects may be displayed to application users assigned, for example, mailbox administrative roles. However, other application users, assigned, for example, task administrative roles, may not have access or be displayed the mailbox management objects or their corresponding properties and settings.

Figure 3A:
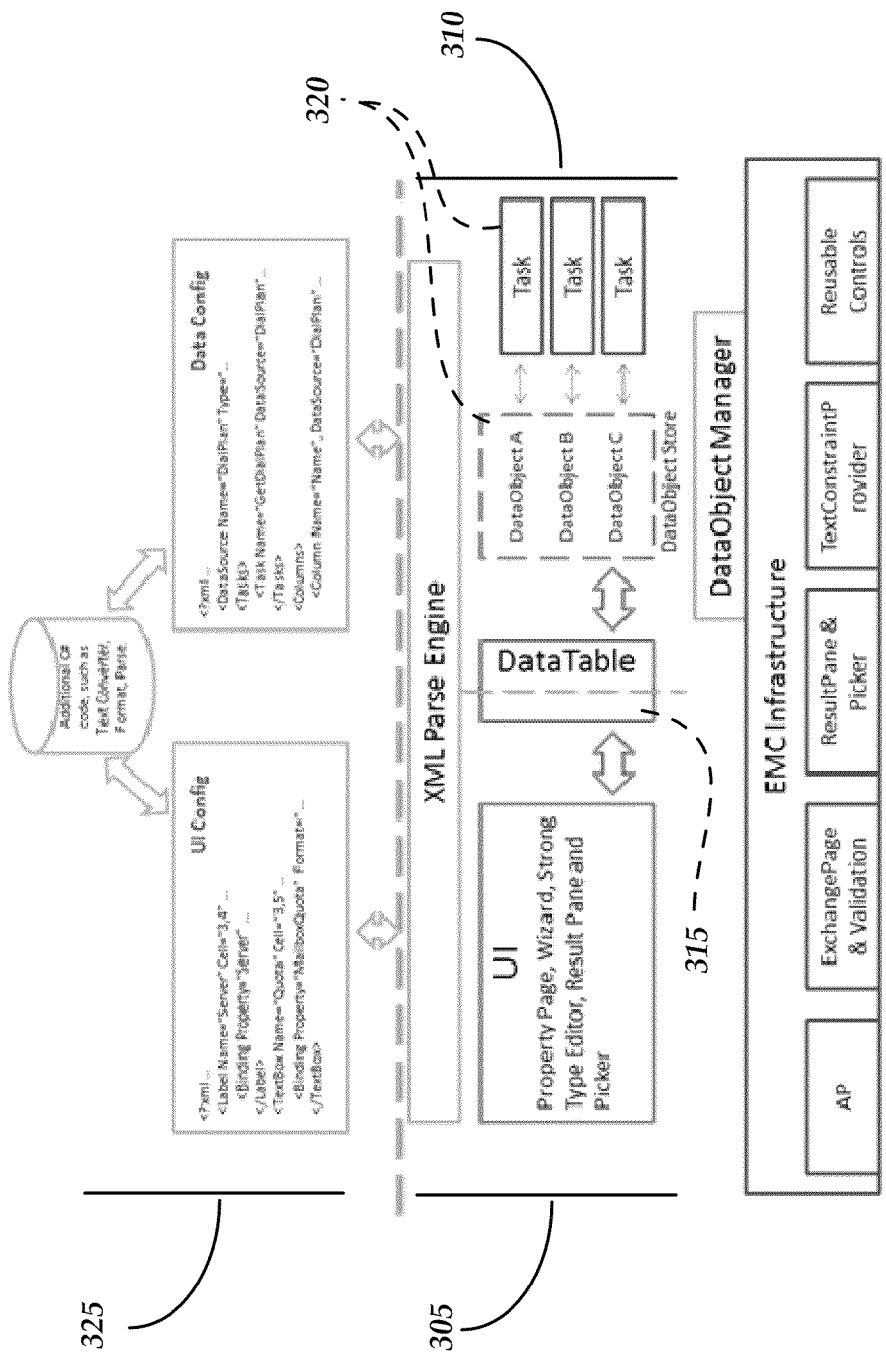
FIG. 3A shows a management application component interaction diagram.

FIG. 3A shows a management application component interaction diagram 300. Consistent with embodiments of the invention, application GUI layer 305 may be separated from a data layer 310 by a data table 315. In this way, GUI layer 305 may only see data layer 310 through data table 315. As a result, GUI layer 305 may operate based on controls used to represent data stored in data table 315, and may not be in direct communication with underlying data objects and tasks 320 associated with data layer 310. Data layer 310 may determine a way to load data objects and tasks 320, and how data objects and tasks 320 may be represented within data table 315.

Application GUI layer 305 and data layer 310 may be in communication with a configuration layer 325. In embodiments of the invention, configuration layer 325 may comprise an Extensible Markup Language (XML) driven framework for implementing and defining, for example, objects 205, properties 235, and various other RBAC-aware components of management application 200. Using this framework, as further detailed with respect to FIG. 3B, Cmdlets and parameters 110 may be derived for operating underlying application functionality.

FIG. 3B shows an example of an XML driven framework 330 for implementing RBAC-aware application components to provide a role-based GUI. The XML framework 330 may comprise, for example, XML schema files having declarations associated with data layer 310, such as a Pages declaration 335, a Data Objects declaration 340, and a ReadTasks declaration 345. Consistent with embodiments of the invention, the XML schema files having declarations 335, 240, and 345 may further comprise RBAC metadata associated with RBAC settings for RBAC-aware components within management application 200. The metadata within the XML schema files having declarations 335, 340, and 345 may, in turn, be consumed and analyzed to either permit or restrict functionalities and GUI elements of management application 200.

For example, in order to determine which data objects 205 may be loaded within management application 200 for a particular role 105, Page declaration 335 may be analyzed to identify data objects 205. Each of data objects 205 may have a corresponding Data Objects declaration 340, which may point to a corresponding ReadTasks declaration 345. In turn, ReadTasks declaration 345 may comprise permissions information associated with each of data objects 205. In this way, XML driven framework 330 analysis may determine which data objects 205 to display to user 130 and what permissions user 130 may have associated with data objects 205. A similar framework may be applied for determining permissions and restrictions for object properties 235 and other RBAC-aware components within management application 200.

Figure 4:
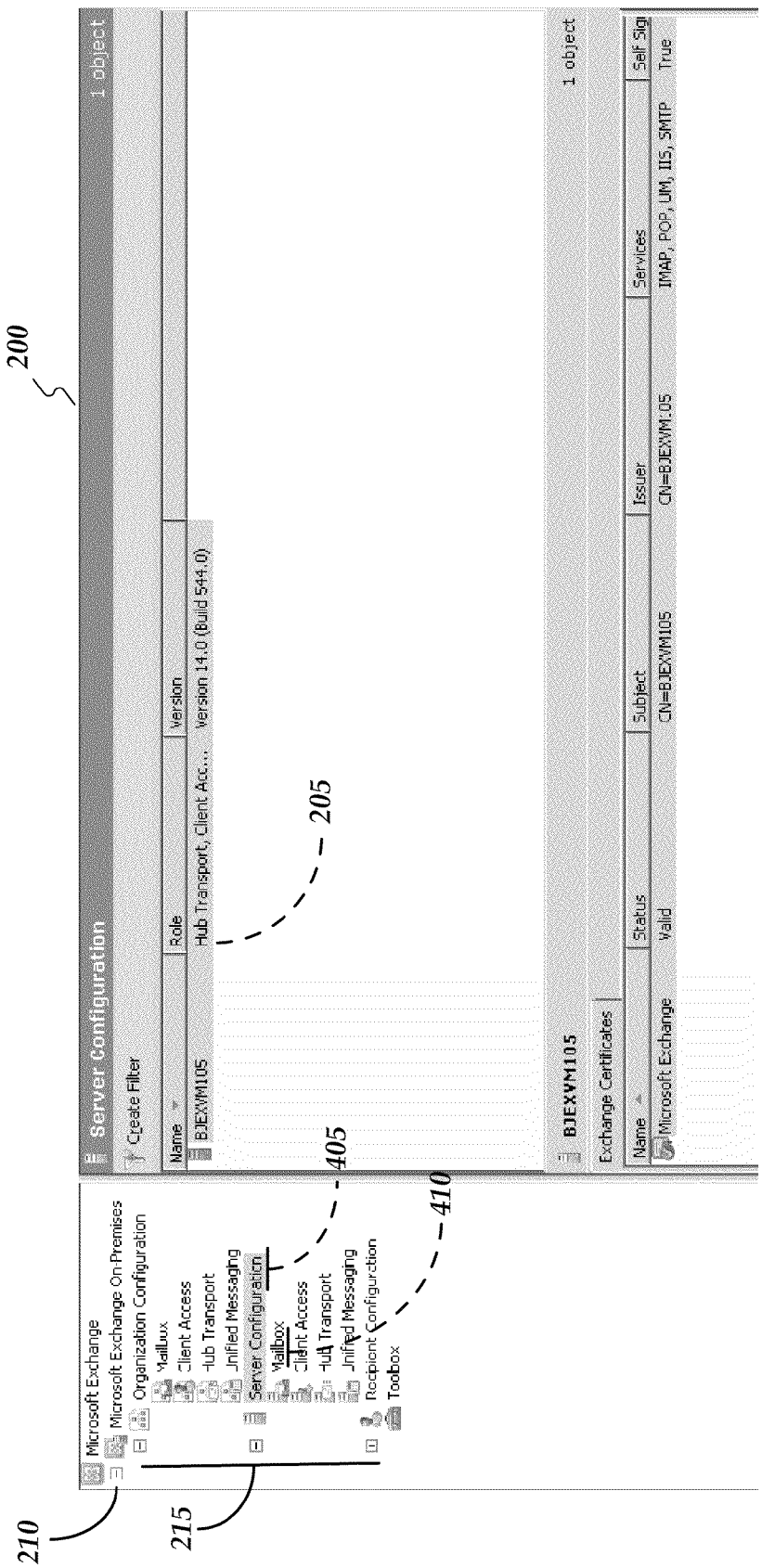
FIG. 4 is another embodiment of an RBAC-aware infrastructure management application.

FIG. 4 is another embodiment of an RBAC-aware infrastructure management application 200. Network elements 215 associated with network domain 210 may be provided within management application 200. Consistent with embodiments of the invention, network elements 215 may comprise a scope node 405 which upon selection may expose at least one child node 410. Selection of child node 410 may cause a loading of corresponding data objects 205 within management application 200. Data objects 205 may be loaded in accordance to the XML driven framework 330 referred to in FIG. 3B, taking into account application user 130's assigned role 105.

With embodiments of the invention, not only may data objects 205 be loaded in accordance to the XML driven framework 330 and the user's role 105, but an extent to which nodes 405 and 410 are exposed may be determined based on the same. Accordingly, rather than displaying at least one child node 410 having no permissible data objects 205 to display to the user, child node 410 may not be displayed at all. For example, if application user 130's role 105 does not grant access to view electronic mailbox-related information associated with network domain 210, then network elements 215 having an association with the mailbox-related information, including nodes 405 and 410 and other corresponding GUI elements, may not be displayed to user 130. This may be done by, for example, restricting mailbox associated Cmdlts and parameters 110 of user 130's assigned role 105.

Embodiments of the invention may iteratively analyze each network element 215 and corresponding nodes 405 and 410 until all network elements 215 have been checked for permissible or restricted RBAC-aware application components. In this way, each scope node 405 and child node 410 may be analyzed with the XML driven framework 330 analysis referred to in FIG. 3B. Accordingly, should no associated data objects 205 be displayable, then corresponding child node 410 may be hidden or locked from display. Similarly, should each child node 410 associated with scope node 405 not be displayable, then corresponding scope node 405 may be hidden or locked from display.

Figure 5:
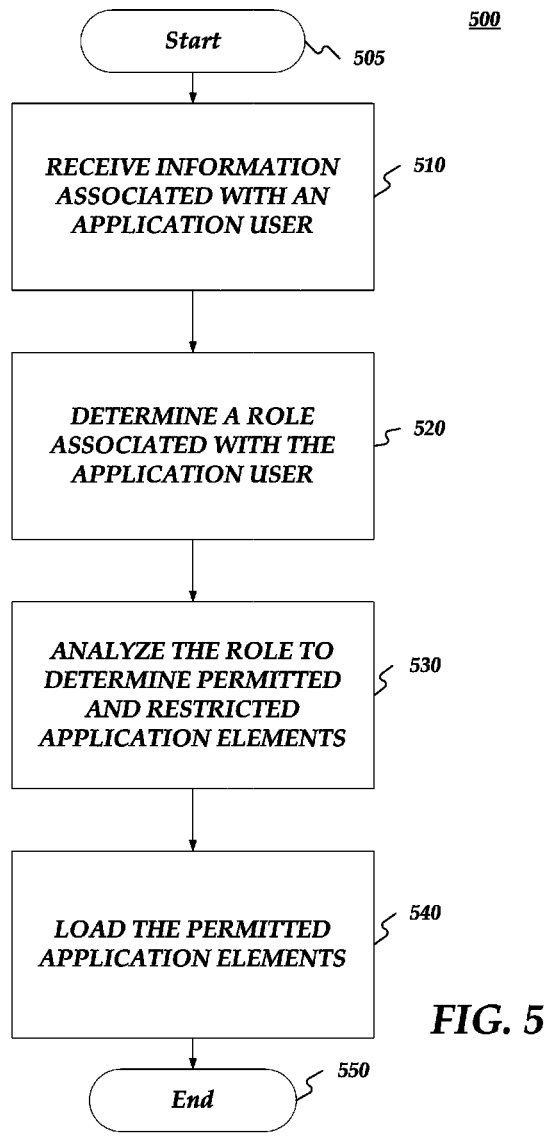
FIG. 5 is a flow chart of a method for providing a role-based GUI.

FIG. 5 is a flow chart setting forth the general stages involved in a method 500 consistent with an embodiment of the invention for providing a role-based GUI. Method 500 may be implemented using a computing device 600 as described in more detail below with respect to FIG. 6. Ways to implement the stages of method 500 will be described in greater detail below.

Method 500 may begin at starting block 505 and proceed to stage 510 where computing device 600 may receive information associated with application user 130. For example, upon user 130's loading of management application 200 or an operating system associated with management application 200, user 130 may be prompted to enter log-in information. This log-in information may then be used to derive identity information for user 130. Embodiments of the invention may derive the identify information for user 130 based on user 130's association with network domain 210.

From stage 510, where computing device 600 receives the information associated with the user 130, method 500 may advance to stage 520 where computing device 600 may determine a role 105 for application user 130. For example, user 130's corresponding role 105 may dictate permitted and restrict elements of management application 200. These application elements may be associated with RBAC-aware components as discussed above, and may be associated with, for example, Cmdlets and parameters 110, scripts 115, data objects 205, network elements 215, actions 225, properties 230, XML schema file declarations 335, 340, and 345, scope nodes 405, and at least one child node 410.

Once computing device 600 determines role 104 for application user 130 in stage 520, method 500 may continue to stage 530 where computing device 600 may analyze role 105 to determine which of the application elements are permitted and restricted to role 105. Consistent with embodiments of the invention, an XML driver framework 330 analysis may be performed to make this determination. For example, RBAC metadata associated with the application elements may be analyzed to determine permissible and restricted to role 105 assigned to user 130. In this way, computing system 600 may know which functionalities, operations, elements, components, and objects of management application 200 may be made accessible to user 130.

After computing device 600 analyzes role 105 to determine permitted and restricted application elements in stage 530, method 500 may proceed to stage 540 where computing device 600 may load permitted application elements. Application element loading may be associated with in application GUI layer 305, data layer 310, and configuration layer 325 and their corresponding operations within management application 200.

For example, certain GUI elements corresponding to permitted application elements, such as data objects 205, may be displayed, while other GUI elements corresponding to restricted application elements may be hidden or restricted operation. Embodiments of the invention may allow for GUI element restriction by displaying a lock icon along with the restricted GUI element. Once computing device 600 loads the permitted application elements and components in stage 540, method 500 may then end at stage 550.

An embodiment consistent with the invention may comprise a system for providing a role-based GUI. The system may comprise a memory storage and a processing unit coupled to the memory storage. The processing unit may be operative and configured to: i) receive information from a user; ii) determine a role for the user; iii) analyze application elements permitted and restricted to the role; and iv) load the application elements by displaying permitted GUI elements associated with permitted application elements and hiding restricted GUI elements associated with restricted application elements.

Another embodiment consistent with the invention may comprise a system for providing a role-based GUI. The system may comprise a memory storage and a processing unit coupled to the memory storage. The processing unit may be operative and configured to: i) determine a type of role corresponding to a system user; ii) group application components associated with the type of role to form a role corresponding to the system user; iii) restrict certain application elements from access by the role, iv) assign the role to the system user; iv) display, to the system user, permitted GUI elements associated with permitted application elements; and v) hide, from the system user, restricted GUI elements associated with restricted application elements.

Figure 6:
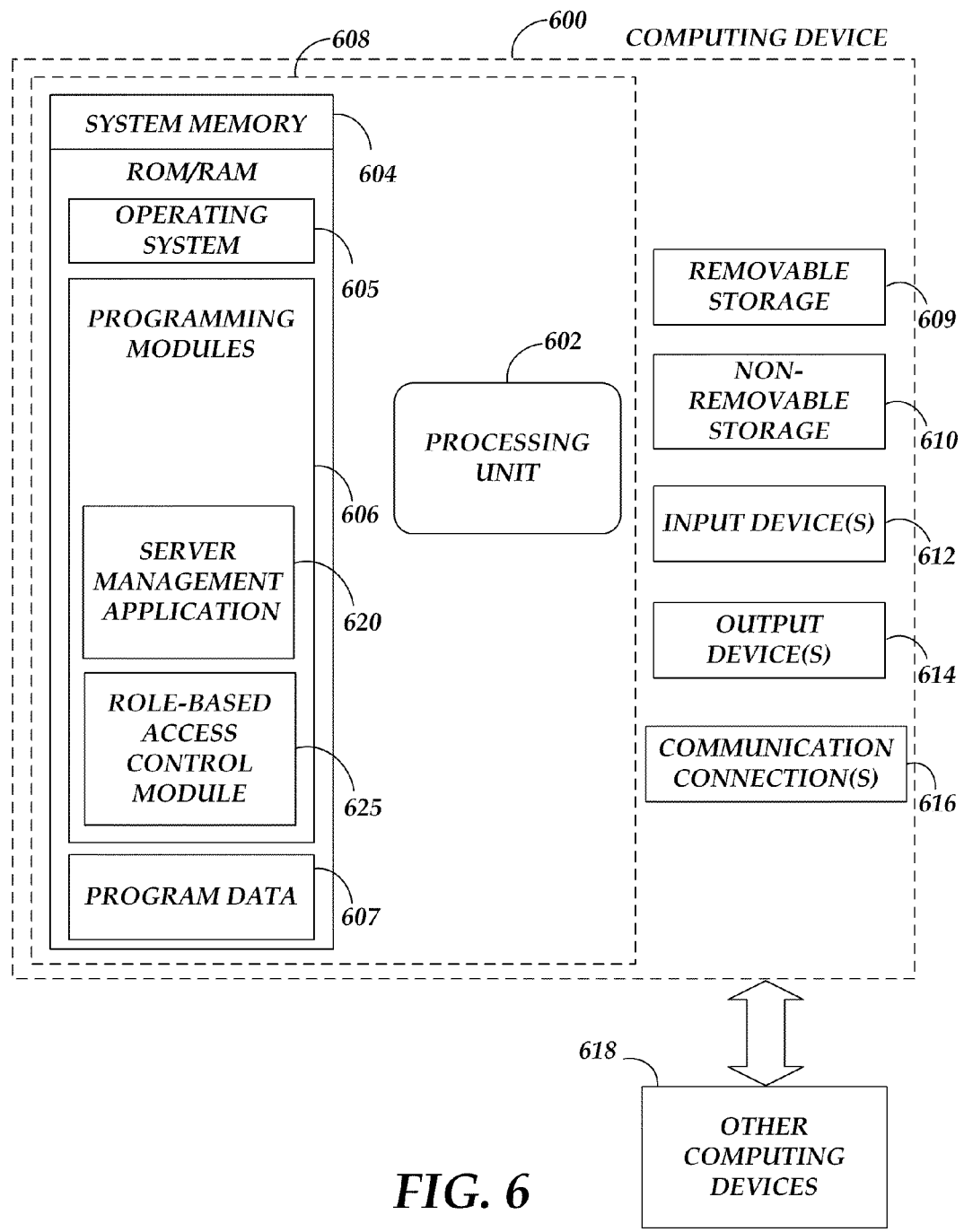
FIG. 6 is a block diagram of a system including a computing device.

FIG. 6 is a block diagram of a system including computing device 600. Consistent with an embodiment of the invention, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the invention. Furthermore, computing device 600 may comprise an operating environment for system 100 as described above. System 100 may operate in other environments and is not limited to computing device 600.

With reference to FIG. 6, a system consistent with an embodiment of the invention may include a computing device, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a program data 607. Operating system 605, for example, may be suitable for controlling computing device 600's operation. Programming modules 606 may include an RBAC module 625 through which application components may be integrated to become RBAC-aware. Furthermore, embodiments of the invention may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g. server management application 620) may perform processes including, for example, one or more method 500's stages as described above. The aforementioned process is an example, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A system for providing a role-based Graphical User Interface (GUI), the system comprising:
   a memory storage; and
   a processing unit, wherein the processing unit is configured to:
   determine a type of role corresponding to a system user,
   group application components associated with the type of role to form a role corresponding to the system user,
   restrict certain application elements from access by the role,
   assign the role to the system user,
   analyze a first schema file to determine a set of operations permitted to the role,
   analyze a second schema file to determine a set of GUI nodes associated with the set of permitted operations,
   iteratively analyze each GUI node of the set of GUI nodes to determine if each GUI node comprises permissible data objects to the role,
   hide a node of the set of GUI nodes when the node comprises none of the permissible data objects,
   display permitted GUI elements associated with permitted application elements, and
   display a lock icon in association with restricted GUI element associated with restricted application elements.

2. The system of claim 1, wherein the permitted application elements and the restricted application elements are derived from the grouped application components.

3. The system of claim 1, wherein receiving the information associated with the application user comprises receiving user identity information from at least one of the following: an application login, a system login, and a network associated with the system user.

4. The system of claim 1, wherein the processing unit configured to determine the type of role corresponding to the system user comprises the processing unit configured to determine the type of role based on information from an application login.

5. The system of claim 1, wherein the processing unit configured to determine the type of role corresponding to the system user comprises the processing unit configured to determine the type of role based on information from a system login.

6. The system of claim 1, wherein the processing unit configured to determine the type of role corresponding to the system user comprises the processing unit configured to determine the type of role based on information from a network associated with the system user.

7. A memory device having a set of instructions which when executed perform a method for providing a role-based Graphical User Interface (GUI), the method comprising:
   determining a type of role corresponding to a system user;
   grouping application components associated with the type of role to form a role corresponding to the system user;
   restricting certain application elements from access by the role;
   assigning the role to the system user;
   analyzing a first schema file to determine a set of operations permitted to the role;
   analyzing a second schema file to determine a set of GUI nodes associated with the set of permitted operations;
   iteratively analyzing each GUI node of the set of GUI nodes to determine if each GUI node comprises permissible data objects to the role;
   hiding a node of the set of GUI nodes when the node comprises none of the permissible data objects;
   displaying permitted GUI elements associated with permitted application elements; and
   displaying a lock icon in association with restricted GUI element associated with restricted application elements.

8. The memory device of claim 7, wherein displaying the permitted GUI elements associated with the permitted application elements comprises displaying the permitted GUI elements associated with the permitted application elements wherein the permitted application elements are derived from the grouped application components.

9. The memory device of claim 7, wherein displaying the lock icon in association with the restricted GUI element associated with restricted application elements comprises displaying the lock icon in association with the restricted GUI element associated with restricted application elements wherein the restricted application elements are derived from the grouped application components.

10. The memory device of claim 7, wherein receiving the information associated with the application user comprises receiving user identity information from at least one of the following: an application login, a system login, and a network associated with the system user.

11. The memory device of claim 7, wherein determining the type of role corresponding to the system user comprises determining the type of role based on information from an application login.

12. The memory device of claim 7, wherein determining the type of role corresponding to the system user comprises determining the type of role based on information from a system login.

13. The memory device of claim 7, wherein determining the type of role corresponding to the system user comprises determining the type of role based on information from a network associated with the system user.

14. A method for providing a role-based Graphical User Interface (GUI), the method comprising:
   determining a type of role corresponding to a system user;
   grouping application components associated with the type of role to form a role corresponding to the system user;
   restricting certain application elements from access by the role;
   assigning the role to the system user;
   analyzing a first schema file to determine a set of operations permitted to the role;
   analyzing a second schema file to determine a set of GUI nodes associated with the set of permitted operations;
   iteratively analyzing each GUI node of the set of GUI nodes to determine if each GUI node comprises permissible data objects to the role;
   hiding a node of the set of GUI nodes when the node comprises none of the permissible data objects;
   displaying permitted GUI elements associated with permitted application elements; and
   displaying a lock icon in association with restricted GUI element associated with restricted application elements.

15. The method of claim 14, wherein displaying the permitted GUI elements associated with the permitted application elements comprises displaying the permitted GUI elements associated with the permitted application elements wherein the permitted application elements are derived from the grouped application components.

16. The method of claim 14, wherein displaying the lock icon in association with the restricted GUI element associated with restricted application elements comprises displaying the lock icon in association with the restricted GUI element associated with restricted application elements wherein the restricted application elements are derived from the grouped application components.

17. The method of claim 14, wherein receiving the information associated with the application user comprises receiving user identity information from at least one of the following: an application login, a system login, and a network associated with the system user.

18. The method of claim 14, wherein the determining the type of role corresponding to the system user comprises determining the type of role based on information from an application login.

19. The method of claim 14, wherein determining the type of role corresponding to the system user comprises determining the type of role based on information from a system login.

20. The method of claim 14, wherein determining the type of role corresponding to the system user comprises determining the type of role based on information from a network associated with the system user.

* * * * *